US012716019B2

(12) United States Patent
Fornes et al.

(10) Patent No.: US 12,716,019 B2

(45) Date of Patent: Aug. 25, 2026

(54) SEMI-CRYSTALLINE TWO-PART POLYURETHANE ADHESIVES FROM AMORPHOUS COMPONENTS

(71) Applicant: LORD Corporation, Cary, NC (US)

(72) Inventors: Timothy D. Fornes, Apex, NC (US); Kraig L Turner, Cary, NC (US)

(73) Assignee: LORD Corporation, Cary, NC (US)

(*) Notice: Subject to any disclaimer, the term of this patent is extended or adjusted under 35 U.S.C. 154(b) by 146 days.

(21) Appl. No.: 18/033,731

(22) PCT Filed: Oct. 25, 2021

(86) PCT No.: PCT/US2021/056412

§ 371 (c)(1),
(2) Date: Apr. 25, 2023

(87) PCT Pub. No.: WO2022/093670

PCT Pub. Date: May 5, 2022

(65) Prior Publication Data

US 2023/0399556 A1 Dec. 14, 2023

Related U.S. Application Data

(60) Provisional application No. 63/105,589, filed on Oct. 26, 2020.

(51) Int. Cl.

*C09J 175/08* (2006.01)
*C09J 175/06* (2006.01)

(52) U.S. Cl.

CPC .......... *C09J 175/08* (2013.01); *C09J 175/06* (2013.01); *C09J 2203/33* (2013.01); *C09J 2301/312* (2020.08); *C09J 2301/50* (2020.08)

(58) Field of Classification Search

CPC .......................... C09J 175/06; C09J 175/08
See application file for complete search history.

(56) References Cited

U.S. PATENT DOCUMENTS 6,316,573 B1 11/2001 Klauck et al.
2003/0139509 A1* 7/2003 Onder ............... C08G 18/6674 524/379
2008/0149257 A1 6/2008 Tribelhorn et al.
(Continued)

FOREIGN PATENT DOCUMENTS

CN 101679581 A 3/2010
CN 105623586 A * 6/2016 ........... C09J 175/06
(Continued)

OTHER PUBLICATIONS

CN-111019587-A_Apr. 17, 2020_English Translation.*
(Continued)

*Primary Examiner* — Michael L Leonard
(74) *Attorney, Agent, or Firm* — KDW FIRM PLLC

(57) ABSTRACT

Reaction-induced crystallizable two-part polyurethane adhesive compositions formed from amorphous constituents. The two-part adhesive compositions can include a polyol resin comprising at least two functional groups, a mono-functional resin containing one functional group; and an isocyanate resin comprising at least two functional groups Methods of forming adhesive compositions are provided. Applications of such adhesive compositions are provided.

23 Claims, 6 Drawing Sheets

(56) References Cited

U.S. PATENT DOCUMENTS

2010/0266520 A1* 10/2010 Arditty .................... A61K 8/90
424/70.11
2011/0028582 A1 2/2011 Leimenstoll
2012/0225302 A1 9/2012 Buechner et al.
2016/0280977 A1* 9/2016 Chen .................. C08G 18/4202
2017/0275512 A1* 9/2017 Bennour ............ C08G 18/7671
2020/0106061 A1 4/2020 Mizuta

FOREIGN PATENT DOCUMENTS

CN 108728032 A * 11/2018 ......... C08G 18/4829
CN 109415480 A 3/2019
CN 111019587 A * 4/2020 ........... C08G 18/724

OTHER PUBLICATIONS

CN-105623586-A_Jun. 1, 2016_English Translation.*
CN-108728032-A_Nov. 2, 2018_English Translation.*
International Preliminary Report on Patentability for Application No. PCT/US2012/056412 dated May 11, 2023.
Chinese Office Action in CN Application No. 202180079934.7 dated Jul. 26, 2025, 4 pages.

* cited by examiner

SEMI-CRYSTALLINE TWO-PART POLYURETHANE ADHESIVES FROM AMORPHOUS COMPONENTS

CROSS-REFERENCE TO RELATED APPLICATION

This application claims priority to U.S. Provisional Patent Application Ser. No. 63/105,589, filed Oct. 26, 2020, incorporated by reference herein in its entirety.

TECHNICAL FIELD

Provided herein are semi-crystalline polyurethanes from amorphous components. More particularly, in some aspects disclosed are adhesive compositions comprising a at least one secondary transition that when reached decreases or reduces the modulus of the adhesive.

BACKGROUND

Various applications require adhesive compositions suitable for withstanding extreme environmental exposures. Moreover, such applications can also require the ability to decrease the modulus of the adhesive when needed for purposes of releasing an adhered component.

One particular application is the use of adhesives to secure components in vehicles and machinery where such components may at some point need to be replaced or removed. An example is the securement of batteries within battery modules or battery modules to cooling plates in electric vehicles. When such batteries need to be replaced, serviced, or recycled significant force is required to remove the batteries, which can result in damage to the batteries and/or cooling plates. Current solutions rely on adhesives that are extremely weak that are prone to delaminating during the normal operation of the vehicle.

What is needed is a robust, high adhesion solution or composition capable of surviving environmental exposures, while also being configured to greatly reduce its adhesive strength upon heat activation. Such a composition would greatly reduce the stress required to remove components during replacement, servicing, and/or recycling of assemblies, including, for example, removing battery modules from cooling plates during the servicing of electric vehicles. Moreover, it is desirable to have a solution or composition that exhibits liquid-like behavior that readily flows when applied to the part in its unreacted state. Such needs are addressed with the presently disclosed subject matter.

SUMMARY

This summary lists several embodiments of the presently disclosed subject matter, and in many cases lists variations and permutations of these embodiments. This summary merely provides examples of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this summary does not list or suggest all possible combinations of such features.

In some embodiments, provided herein are reaction-induced crystallizable two-part polyurethane adhesive compositions formed from amorphous constituents. Such compositions comprise in some embodiments a polyol resin comprising at least two functional groups, and a mono-functional resin containing one functional group, and a isocyanate resin comprising at least two functional groups, wherein the polyol resin and isocyanate resin are included in a first component and a second component, respectively, and wherein the mono-functional resin is contained in one or both of the first and second components such that the first and second components are configured to be mixed to react with each other and the mono-functional resin. In some embodiments, the mono-functional resin comprises a hydroxyl or amine terminal moiety. In some embodiments, the first component further comprises a catalyst. In some embodiments, the first component further comprises a thermally conductivity filler. In some embodiments, the filler is treated with a material capable of co-crystallizing with the composition. By way of example and not limitation, the material can be a silane, a saturated fatty acid, unsaturated fatty acid, organotitinates, etc.

In some aspects, the second component of the composition further comprises a mono-functional resin possessing an isocyanate terminal moiety. The mono-functional resin can, for example, comprise a hydroxyl or amine terminal moiety. In some embodiments, the second component further comprises a thermally conductivity filler. The filler can be treated with a material capable of co-crystallizing with the composition. By way of example and not limitation, the material can be a silane, a saturated fatty acid, unsaturated fatty acid, organotitinates, etc. In some embodiments, the polyol resin comprises secondary hydroxyl moieties.

In some embodiments, the mono-functional resins of the first component and/or the second component comprise an alkyl backbone whose length is less than the length to cause the composition to crystallize at a temperature of about 25° C. In some embodiments, the compositions have a secondary transition greater than about 20° C. but less than about 85° C. In some embodiments, the polyol and isocyanate resins are based on linear or planar structures. In some embodiments, the polyol resin comprise a polyether polyol. In some embodiments, the isocyanate resin comprise an aliphatic isocyanate. In some embodiments, the isocyanate resin comprise an aromatic isocyanate.

In some embodiments, a reacted composition has a decrease in modulus after the secondary transition that is at least 20% lower than the modulus before the secondary transition.

In some embodiments, the selection of mono-functional, polyol, and isocyanate resins produce a cured composition having at least two secondary thermal transitions. In some embodiments, the mono-functional resin comprises an alkyl monol, the polyol comprises castor oil (or polyether, polyester, or hydrocarbon polyol), and the isocyanate comprises a mixture of linear, aliphatic isocyanate and an aromatic isocyanate. In some embodiments, the compositions further comprise a crystallized form of the composition in addition to the first and second components.

Provided herein in some embodiments are methods of forming the compositions disclosed herein, including combining the first component and second component at a room temperature, e.g. 20-25° C. (68-77° F.), or at temperature equal to or below a corresponding melting temperature that crystals are formed, and reacting the first and second components to cause the composition to at least partially crystallize. In some embodiments, such methods can further comprise adding to the combination of the first component and second component a portion of pre-made crystallized form of the composition. In some embodiments, such methods further comprise adding a catalyst, optionally wherein the catalyst is added to the first component. In some embodiments, such methods further comprise adding a thermally conductivity filler, optionally wherein the thermally conductivity filler is added to the first component. In some embodiments, the composition comprises a catalyst, water, and optionally a blowing agent for the purpose of producing a cured foam.

Provided herein are methods of adhering an element to a substrate, the methods comprising providing an adhesive composition as disclosed herein, providing a substrate and an element, and applying the adhesive composition to the substrate and/or element to adhere the element to the substrate. In some embodiments, the element is a battery, optionally a battery configured for an electric vehicle. In some embodiments, the element is removable from the substrate after adhesion due to a temperature-induced transition of the adhesive composition. In some embodiments, applying the adhesive composition comprises meter-mixed dispensing, spraying, brushing, dipping, and/or rolling the adhesive on the substrate and/or element.

In some embodiments, provided is a reaction-induced crystallizable two-part adhesive composition formed from amorphous constituents comprising a resin comprising at least two reactive functional groups, a mono-functional additive containing one reactive functional group, and a curative comprising at least two reactive functional groups, wherein the resin and curative are included in a first component and a second component, respectively, and wherein the mono-functional additive is contained in one or both of the first and second components such that the first and second components are configured to be mixed to react with each other and the mono-functional additive.

Accordingly, it is an object of the presently disclosed subject matter to provide semi-crystalline two-part polyurethanes from amorphous components and applications for using the same. This and other objects are achieved in whole or in part by the presently disclosed subject matter. Further, an object of the presently disclosed subject matter having been stated above, other objects and advantages of the presently disclosed subject matter will become apparent to those skilled in the art after a study of the following description, Drawings and Examples.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

DETAILED DESCRIPTION

Figure 1:
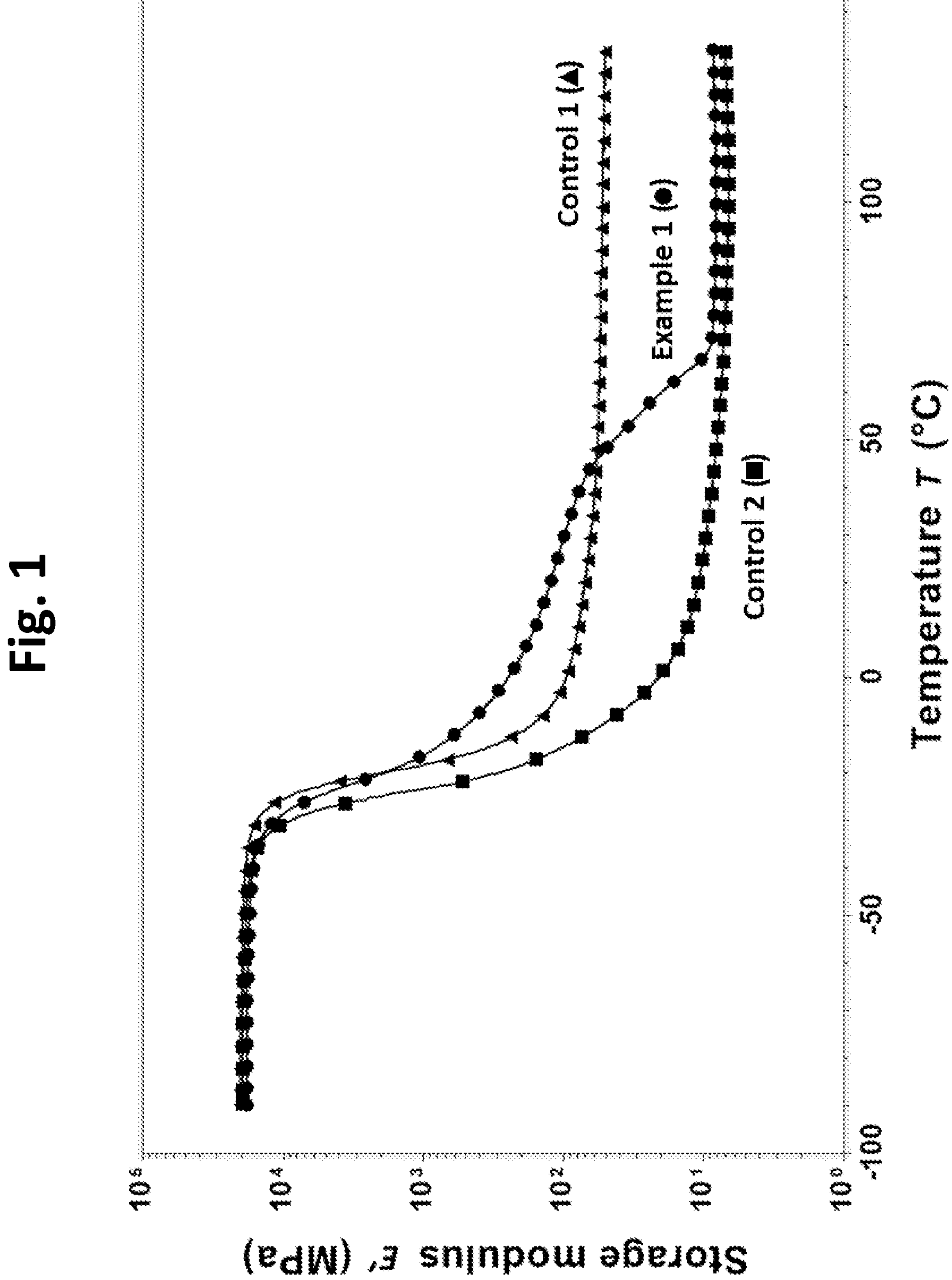
FIG. 1 is a plot of storage modulus versus test temperature showing the difference in transition behavior between state of art compositions (Controls 1 and 2) versus a reaction-induced semi-crystalline polyurethane (Example 4).

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

I. Definitions

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a component" includes a plurality of such components, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, dose, mass, weight, temperature, time, volume, concentration, percentage, etc., is meant to encompass variations of in some embodiments ±20%, in some embodiments ±10%, in some embodiments ±5%, in some embodiments 1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein the term "alkyl" refers to $C_{1-24}$ inclusive, linear (i.e., "straight-chain"), branched, or cyclic, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl, or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 24 carbon atoms, e.g., 10, 11, 12, 13, 14, 15, 16, 17, 18, 19, 20, 21, 22, 23 or 24 carbon atoms. In certain embodiments, "alkyl" refers, in particular, to $C_{1-8}$ straight-chain alkyls. In other embodiments, "alkyl" refers, in particular, to $C_{1-8}$ branched-chain alkyls.

Alkyl groups can optionally be substituted (a "substituted alkyl") with one or more alkyl group substituents, which can be the same or different. The term "alkyl group substituent" includes but is not limited to alkyl, substituted alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. In some embodiments, there can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

Thus, as used herein, the term "substituted alkyl" includes alkyl groups, as defined herein, in which one or more atoms or functional groups of the alkyl group are replaced with another atom or functional group, including for example, alkyl, substituted alkyl, halogen, aryl, substituted aryl, alkoxyl, hydroxyl isocyanate, carboxyl, phosphate, anhydride nitro, amino, alkylamino, dialkylamino, sulfate, mercapto, glycidyl, acrylate, methacrylate, siloxy, silanol, hydride, and vinyl "Alkoxyl" refers to an alkyl-O— group wherein alkyl is as previously described. The term "alkoxyl" as used herein can refer to, for example, methoxyl, ethoxyl, propoxyl, isopropoxyl, butoxyl, t-butoxyl, and pentoxyl. The terms "alkoxy" and "oxyalkyl" can be used interchangably with "alkoxyl".

The term "silyl" refers to groups comprising silicon atoms (Si).

The term "silane" refers to a molecule comprising a silicone atom.

As used herein, the terms "siloxy" and "silyl ether" refer to groups or compounds including a silicon-oxygen (Si—OR) bond and wherein R is an organic group, such as a substituted or unsubstituted alkyl or aryl group (i.e., methyl, ethyl, phenyl, etc.). In some embodiments, the terms refer to compounds comprising one, two, three, or four alkoxy, aralkoxy, or aryloxy groups bonded to a silicon atom. Each alkyloxy, aralkoxy, or aryloxy group can be the same or different.

II. Discussion a. General Considerations

Disclosed herein are semi-crystalline polyurethane (PUR) compositions formed from stable, two-part amorphous components, also referred to in some embodiments as two component PUR adhesive gap fillers with two-phase properties. In some aspects, the compositions disclosed herein comprise a crystalline feature is a reaction product of a planar, multifunctional, aliphatic isocyanate with a monofunctional aliphatic, linear alcohol. As disclosed herein, the combination of these two compounds that upon reacting with one another can create a crystalline structure based on long highly linear aliphatic chains containing intermediate, H-bonding urethane linkages.

Moreover, as disclosed herein, when employed in a traditional urethane formulation, the reaction-induced crystallizable components allow for a secondary thermal transition temperature, above which can, but does not always, result in an order of magnitude drop in modulus of the polyurethane. The magnitude and location of this transition temperature can in some embodiments be tunable by altering the amount and structure of the isocyanate and monol as well as via the presence of a filler that serve as a nucleating agent. Moreover, the phenomenon is in some aspects reproducible with a planar, multifunctional, aliphatic polyol with a mono-functional aliphatic, isocyanate as well as via similar structures containing different reactive moieties such as, but not limited to, amine/isocyanate, epoxy/amine, hydride/vinyl, etc., or any combination of relevant reactive moieties.

Additionally, the presently disclosed subject matter can in some embodiments be particularly useful for applications where thermally releasable adhesives are desirable. By way of example and not limitation, in some aspects the disclosed compositions can reduce the forces necessary to remove batteries from modules and/or modules that are adhered to cooling plates by thermally conductive adhesives. Moreover, the starting two-part formulation can be stable and free of crystallites in its unreacted state. Other practical uses for the disclosed compositions but not limited to can for example involve thermally switchable gas or moisture permeability, index of refraction, heat adsorbing/releasing applications such as phase change materials given the crystallizable nature of the invention.

b. Two-Part Semi-Crystalline Polyurethane Compositions and Uses of the Same

Semi-crystalline polyurethanes that are formed from stable, two-part amorphous components are provided herein. The crystalline feature is a reaction product of a planar, multifunctional, aliphatic isocyanate with a mono-functional aliphatic alcohol. The reaction-induced crystallizable components allow for a secondary thermal transition temperature, above which results in an order of magnitude drop in modulus of the polyurethane. The compositions of the present disclosure may be particularly useful for reducing the forces necessary to remove elements adhered to a substrate by thermally conductive polyurethanes, including for example but not limited to batteries inside of modules and/or battery modules that are adhered to cooling plates. Moreover, compositions of the present disclosure being amorphous prior to reaction advantageously provide an adhesive composition that more readily flows when applied to the part in its unreacted state. This is particularly advantageous over existing compositions, e.g. solid crystalline waxes, where solid particles undesirably increase viscosity.

More particularly, in some embodiments provided is a reaction-induced crystallizable two-part adhesive composition formed from amorphous constituents. This composition can comprise a resin comprising at least two reactive functional groups, a mono-functional additive containing one reactive functional group, and a curative comprising at least two reactive functional groups, wherein the resin and curative are included in a first component and a second component, respectively, and wherein the mono-functional additive is contained in one or both of the first and second components such that the first and second components are configured to be mixed to react with each other and the mono-functional additive. In some aspects, the first component further comprises a catalyst. In some embodiments the first component further comprises a thermally conductivity filler. The filler can be treated with material capable of co-crystallizing with the composition. In some embodiments, the second component further comprises a mono-functional resin possessing an isocyanate terminal moiety. The composition can have at least one secondary transition greater than about 25° C. but less than about 85° C. The composition can have a decrease in modulus after the secondary transition that is at least about 20% lower than the modulus before the secondary transition.

Likewise, in some embodiments provided herein are reaction-induced crystallizable two-part polyurethane adhesive compositions. Such composition can be formed from amorphous constituents, including for example but not limited to a first component and a second component (also referred to as a two-part or 2K composition). In some aspects, the first component of the two-part crystallizable two-part polyurethane adhesive comprises a polyol resin containing of least two functional groups, and/or a mono-functional resin comprising at least one hydroxyl or amine terminal moiety. In some embodiments, the second component comprises an isocyanate resin of at least two functional groups.

Continuing further with the first component of the two-part crystallizable two-part polyurethane adhesive, the mono-functional resin contains one functional group. In some aspects, the first component further comprises a catalyst. Moreover, in some embodiments, the first component also further comprises a thermally conductivity filler. The filler can be treated with a material capable of co-crystallizing with the composition. By way of example and not limitation, the material can be a silane, a saturated fatty acid, unsaturated fatty acid, organotitinates, etc.

In some embodiments, the polyol resin in the first component, including one containing of least two functional groups, further comprises secondary hydroxyl moieties. Additionally, in embodiments where a mono-functional resin is present in the first component, such mono-functional resin contains one hydroxyl or amine terminal moiety.

Continuing further with the second component of the two-part crystallizable polyurethane adhesive, the second component in some embodiments further comprises a mono-functional resin possessing an isocyanate terminal moiety. In some aspects, the second component can further comprise a thermally conductivity filler. The filler can be treated with a material capable of co-crystallizing with the composition. By way of example and not limitation, the material can be a silane, a saturated fatty acid, unsaturated fatty acid, organotitinates, etc.

In some aspects, the mono-functional resins of the first component (A side) and/or the second component (B side), comprise an alkyl backbone whose length is less than the length needed to cause the composition to crystallize (e.g. a length of at least six carbons, optionally about 8 to about 12 carbons or more, optionally a chain with one or more branches) at a temperature of about 20° C., or a temperature of about 5° C. to about 40° C., or a temperature of about 10° C. to about 30° C., or a temperature of about 15° C. to about 25° C. In some aspects, the disclosed compositions are configured to avoid crystallization during cold storage, e.g. about 0° C. Being amorphous prior to reaction advantageously provides an adhesive composition that more readily flows when applied to the part in its unreacted state.

Notably, as discussed in the Examples herein and as shown in the Figures, the disclosed two-part crystallizable polyurethane adhesive compositions can have at least one secondary transition phase or property, where such secondary transition phase or property is tunable or selectable dependent upon the application. Such secondary transition can occur at greater than about 5° C. to about 35° C. (e.g. about 5° C., 10° C., 15° C., 20° C., 25° C., 30° C. or 35° C.), but less than about 50° C. to about 90° C. (e.g. about 50° C., 55° C., 60° C., 65° C., 70° C., 75° C., 80° C., 85° C. or 90° C.). In some aspects, the secondary transition can occur at greater than about 20° C. but less than about 70° C. In some aspects, such secondary transition phase or property of the disclosed compositions can be tunable, customizable, or adjustable by changing the makeup of the composition and/or relative concentrations therein. For example, the magnitude and location of this transition temperature can in some embodiments be tunable by altering the amount and structure of the isocyanate and monol. Alternatively, or in addition, magnitude and location of this transition temperature can in some embodiments be tunable by altering the presence of a filler that serve as a nucleating agent. By way of example and not limitation, such fillers can comprise siliceous fillers (silica, talc, mica, silicon carbide, glass fibers, glass beads, etc), carbonaceous fillers (graphite, carbon black, carbon nanotubes, etc), metallic fillers (aluminum, silver, copper, etc), metal oxides (alumina, magnesium oxide), other ceramics (boron nitride, aluminum trihydrate, aluminum nitride, etc.), non-woven fibers, and/or woven fibers.

Continuing further, in some embodiments the polyol and isocyanate resins of the two-part compositions are based on linear and/or planar structures. In some aspects, the polyol resin comprises a polyetherpolyol. In some embodiments, the isocyanate resins comprise a linear, aliphatic isocyanate. In some embodiments, the isocyanate resins comprise an aromatic isocyanate.

The disclosed two-part crystallizable polyurethane adhesive compositions, when reacted, can have at least one secondary transition phase or property. Such secondary transition can occur at greater than about 5° C. to about 35° C. (e.g. about 5° C., 10° C., 15° C., 20° C., 25° C., 30° C. or 35° C.), but less than about 50° C. to about 90° C. (e.g. about 50° C., 55° C., 60° C., 65° C., 70° C., 75° C., 80° C., 85° C. or 90° C.). In some aspects, the secondary transition can occur at greater than about 20° C. but less than about 70° C.

The disclosed compositions are in some embodiments be configured to have a decrease in modulus after the secondary transition discussed herein and above. In some embodiments, the decrease or reduction in modulus after entering or reaching the secondary transition is at least about 20% lower than the modulus before the secondary transition. In some embodiments, the decrease or reduction in modulus after entering or reaching the secondary transition is at least about 5% lower to about 90% lower, or about 10% lower to about 75% lower, or about 15% lower to about 50% lower, or about 20% lower to about 30% lower, than the modulus before the secondary transition.

Moreover, in some embodiments, the selection of monofunctional, polyol, and isocyanate resins in the disclosed compositions produce a cured composition having at least two secondary thermal transitions, where the second transition can be the melting of distinct crystalline phases. The mono-functional resins can comprise an alkyl monol, including any saturated fatty alcohol or any alkyl monol with at least 6 carbons attached to the alcohol group. In some aspects, the polyol comprises, but it not limited to, a polyether polyol, polyester polyol, hydrocarbon-based polyol, polycarbonate polyol, or any polyol materials. In a further aspect, the polyol comprises a castor oil, polypropylene glycol, or hydroxyl functional polybutadiene. Finally, the isocyanate in some embodiments comprises a mixture of linear, aliphatic isocyanate and an aromatic isocyanate.

In some embodiments, at least a portion of the disclosed two-part crystallizable polyurethane adhesive compositions can crystallize. That is, in some aspects, provided are polyurethane adhesive compositions that comprise a crystallized form of the composition in addition to the first and second components disclosed herein.

Continuing further, and in contrast to existing compositions, the presently disclosed compositions in some aspects contain an isocyanate that is pre-reacted with a monol. In some embodiments, the disclosed compositions are made in a one-step process (vs a two-step process) and do not involve forming an "alcohol added isocyanate" prepolymer before making the final adhesive. Additionally, the presently disclosed compositions are not restricted to an isocyanate with functionality of three or greater. In some aspects, difunctional NCOs, especially linear ones, can be preferred.

In some aspects, a monofunctional material in the disclosed compositions is isocyanate, amine, acid, or alternative functionality with preferably aliphatic substituents capable of both crystallizing via linear chains and hydrogen bonding.

In contrast to existing compositions, the presently disclosed compositions are not aqueous compositions. Instead, the presently disclosed adhesive compositions are in some embodiments made of 100% solids, in a two-part system, or at least substantially entirely solids. Moreover, the presently disclosed compositions contain no component which comprises sulfonate and/or carboxylate groups and which furthermore has at least one isocyanate-reactive hydroxyl and/or amino group. And the presently disclosed compositions are not restricted to having a difunctional polyester polyols of a given molecular weight.

The presently disclosed compositions in some aspects contain at least one mono-functional (preferably a monol) component that is amorphous in the unreacted state buy reacts to form a semi-crystalline polymer. Additionally, the presently disclosed compositions can optionally include a filler particle which is not restricted to a "carbonaceous nanoparticle" mixed with "polyurethane dispersion". Instead, the presently disclosed compositions can include mixing filler with monomers of polyurethane.

The disclosed two-part crystallizable polyurethane adhesive compositions can be formed by any suitable method as would be appreciated by one of ordinary skill in the art. By way of example and not limitation, such compositions can be formed by combining the first component and second components, and bringing the combined components or composition to a temperature to react and cause crystallization. In some embodiments, bringing the composition to a temperature of about 10° C. to about 40° C., or preferably about 20° C., can be sufficient to cause it to crystallize.

In some aspects, when the disclosed two-part crystallizable polyurethane adhesive compositions are formed a premade crystallized form of the composition, as disclosed herein, can be added to the either or both of the first component and second component. Moreover, such methods of forming the two-part crystallizable polyurethane adhesive compositions can comprise the use of or addition of a catalyst, optionally wherein the catalyst is added to the first component. Additionally, such methods can further comprise use or addition of a thermally conductivity filler, optionally wherein the thermally conductivity filler is added to the first component.

Provided herein are methods of using the disclosed two-part crystallizable polyurethane adhesive compositions. Such methods can include using the compositions to adhere one substrate to another, adhere an element to a substrate, join two elements, and the like. By way of example and not limitation, a battery or similar element, e.g. a battery configured for an electric vehicle, is adhered to a substrate, module assembly or cooling plate. The adhesive composition is applied using any known method suitable for the application, including for example meter-mixed dispensing, spraying, brushing, dipping, and/or rolling the adhesive on the substrate and/or element.

The adhesive composition is configured to provide sufficient strength to secure the battery or similar element in place. However, as discussed herein, the disclosed compositions in some embodiments have at least one secondary transition, that when reached the modulus of the adhesive. As such, in some applications the element, e.g. a battery, can be removable from the substrate after adhesion due to the temperature-induced transition of the adhesive composition. The temperature-induced transition of the adhesive compositions disclosed herein greatly reduces the stress required to remove battery modules from cooling plates during the servicing of electric vehicles. Moreover, the solution provides provide a robust, high adhesion solution needed to survive environmental exposures. The compositions and methods disclosed herein can also be used in other applications that require adhesives rework/servicing of a part.

In some embodiments, the adhesive is provided as a "one part" or 1K formulation, wherein all the constituent materials are provided in a single mixture. In some embodiments, particularly where components may react with each other, for example when a catalyst is used, the constituents are separated into two parts, i.e. 2K. In this embodiment, typically the catalyst is separated from all of the other components, other than a carrier solvent. However, depending upon the reactivity, it may be advantageous to have other constituents in the part containing the catalyst.

III. Examples

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Tables 1 and 2 provide summary of formulations and supporting data that provide illustrative/exemplary examples of semi-crystalline two component (or two-part) polyurethane (PUR) from amorphous components. Controls 1 and 2 provide comparative examples of state of art formulations that when reacted thermosetting networks that are amorphous in nature. The polyol and isocyanate in the controls and examples were reacted in the presence of a catalyst along with a number of additional ingredients often used in the preparation of practical thermally conductive adhesives. These additional ingredients can in some embodiments be deemed non-essential to the key embodiments of this invention, include thermally conductive fillers, rheological modifiers (wetting agents, thixotropic agent), flame retardant, pigment, and water scavenger. The polyol and isocyanate components were each prepared by mixing the respective ingredients (see Table 1) of the polyol component ("A-side") and isocyanate components ("B-side) under vacuum using a DAC800 Hauschild mixer. The full-formulated A- and B-sides were then mixed according the specified mix ratio by weight (see Table 1) and cured at room temperature for a minimum of 24 hours. Storage modulus and tan δ was measured on ~2 mm thick specimens using a TA Instruments DMA 850 dynamic mechanical analyzer at a test frequency of 1 Hz, a heating rate of 3° C./min, and a single cantilever test configuration. A summary of relevant primary and secondary transitions (taken from distinct peaks in tan δ) along with storage modulus at values 25° C. and 80° C. are reported in Table 2. The ratio of storage modulus for these two temperatures is also reported. The following is a summary of key compositional differences between the Controls and Examples.

TABLE 1

| Ingredient | Role | Control 1 Wt % | Control 2 Wt % | Ex. 1 Wt % | Ex. 2 Wt % | Ex. 3 Wt % | Ex. 4 Wt % | Ex. 5 Wt % | Ex. 6 Wt % | Ex. 7 Wt % |
|---|---|---|---|---|---|---|---|---|---|---|
| | | Example No. | | | | | | | | |
| Polyol Component (A-side) | | | | | | | | | | |
| Castor Oil | Ricinoleic acid(90%) based polyester polyol resin | — | — | — | — | 5.04 | 4.51 | 5.01 | 5.59 | 66.72 |
| Polypropylene oxide-based triol (1,500 MW) | Polyether polyol resin | — | 5.08 | 6.35 | 6.59 | — | — | — | — | — |
| Polypropylene oxide-based diol (1000 MW) | Polyether polyol resin | 10.78 | — | — | — | — | — | — | — | — |
| Polypropylene glycol monobutyl ether (MW = 340) | Mono-functional resin (non-crystallizable) | — | 5.49 | — | — | — | — | — | — | — |
| 1-Decanol | Mono-functional resin (crystallizable) | — | — | 2.54 | 2.77 | 3.39 | — | — | — | — |
| Isostearyl alcohol | Mono-functional resin (crystallizable) | — | — | — | — | — | 4.43 | — | — | — |
| 1-Dodecanol | Mono-functional resin (crystallizable) | — | — | — | — | — | — | 3.47 | — | 30.28 |
| 2-Phenoxy alcohol | Mono-functional resin (crystallizable) | — | — | — | — | — | — | — | 2.97 | — |
| Sn-based catalyst | Reaction Catalyst | 0.11 | | 0.11 | 0.11 | 0.11 | 0.10 | 0.15 | 0.14 | 3.00 |
| Wetting Agent | Wetting Agent | 0.274 | | 0.45 | 0.19 | 0.42 | 0.38 | 0.33 | 0.51 | — |
| Fumed Silica | Rheological thixotrope agent | — | 0.11 | 0.66 | 0.46 | 0.37 | — | — | — | — |

TABLE 1-continued

| | | Example No. | | | | | | | | |
|---|---|---|---|---|---|---|---|---|---|---|
| Ingredient | Role | Control 1 Wt % | Control 2 Wt % | Ex. 1 Wt % | Ex. 2 Wt % | Ex. 3 Wt % | Ex. 4 Wt % | Ex. 5 Wt % | Ex. 6 Wt % | Ex. 7 Wt % |
| Flame Retardant | Flame Retardant | 0.776 | 1.28 | 2.50 | 2.47 | 3.08 | 2.28 | 2.27 | 2.60 | — |
| Red iron oxide | Pigment | 0.216 | 0.18 | 0.23 | 8.18 | 0.20 | 0.33 | 0.25 | 0.34 | — |
| Zeolite powder | Moisture scavenger | 0.99 | 1.01 | 0.96 | 0.94 | 0.96 | 1.28 | 1.46 | 1.49 | — |
| Filler | Thermal conductivity/ reinforcement | 86.85 | 86.85 | 86.19 | 86.30 | 86.44 | 86.69 | 87.06 | 86.35 | — |
| A-Side Total | | 100.00 | 100.00 | 100.00 | 100.00 | 100.00 | 100.00 | 100.00 | 100.00 | 100.00 |
| | | Isocyanate Component (B-side) | | | | | | | | |
| Trifunctional isocyanate based on hexamethylene disocyante | Isocyanate resin | 4.09 | 4.29 | 5.42 | — | 6.32 | 5.42 | 6.27 | 7.21 | 100.00 |
| Uretdione based on hexamethylene diisocyanate | Isocyanate resin | — | — | — | 5.76 | — | — | — | — | — |
| Wetting Agent | Wetting Agent | | 0.41 | 0.40 | — | 0.36 | 0.45 | 0.40 | 0.47 | — |
| Fumed Silica | Rheological thixotrope agent | | — | 0.24 | — | — | — | — | — | — |
| Flame Retardant | Flame Retardant | 9.47 | 8.99 | 7.83 | 7.80 | 7.04 | 7.84 | 8.16 | 8.29 | — |
| Zeolite powder | Moisture scavenger | 1.02 | 0.99 | 0.99 | 0.97 | 0.99 | 1.18 | 1.09 | 1.25 | — |
| Filler | Thermal conductivity/ reinforcement | 85.41 | 85.31 | 85.12 | 85.47 | 85.29 | 85.11 | 84.08 | 82.77 | — |
| B-Side Total | | 100.00 | 100.00 | 100.00 | 100.00 | 100.00 | 100.00 | 100.00 | 100.00 | 100.00 |
| A to B Mix Ratio by Weight | | 0.986 | 0.968 | 0.978 | 0.978 | 0.971 | 0.959 | 1.00 | 1.04 | 1.43 |

TABLE 2

| | Dynamic Mechanical Analysis Data | | | | |
|---|---|---|---|---|---|
| Example — | Glass Transition Temperature* ° C. | Melting Peak – Tan Delta Peak ° C. | Storage Modulus @ 25° C. MPa | Storage Modulus @ 80° C. MPa | E'(25° C.)/ E'(80° C.) Ratio — |
| Control 1 | −18 | None | 67.3 | 54.2 | 1.2 |
| Control 2 | −21 | None | 1.7 | 0.85 | 2.0 |
| 1 | −19 | 57 | 111 | 8.4 | 13.2 |
| 2 | −22 | 57 | 14.8 | Too low to measure. | NA |
| 3 | −23 | 57 | 66.3 | 14.9 | 4.4 |
| 4 | −17 | 51 | 12.4 | 1.5 | 8.3 |
| 5 | −8 | 58 | 174 | 2.5 | 69.6 |
| 6 | −3 | 54, 77 | 6.8 | 0.38 | 17.9 |
| 7 | 2 | 44, 71 | 4.25 | 0.21 (at 90° C.) | 20.2 |

Control 1

A two-component urethane composition, containing no mono-functional species, was prepared according to Table 1 by using a polypropylene oxide-based diol polyol resin (amorphous liquid, MW=1000) and trifunctional isocyanate based on hexamethyl diisocyanate (amorphous liquid). FIG. 1 shows plot of storage modulus versus temperature for Control 1. The curve exhibits a large primary transition (glass transition) at nominally −18° C. in which the material goes from a rigid glassy state to a soft, rubbery state. Beyond this transition, material's modulus exhibits a classic rubbery plateau. The ratio between the modulus at 25° C. and in the plateau state at 80° C. is 1.2.

Control 2

A two-component urethane composition was prepared according to Table 1 by using a polypropylene oxide-based triol (amorphous liquid, MW=1500) polyol resin, a non-crystallizable mono-functional species based on polypropylene glycol monobutyl ether (amorphous liquid, MW=340), and a trifunctional isocyanate based on hexamethyl diisocyanate (amorphous liquid). FIG. 1 shows plot of storage modulus versus temperature for Control 2. Similar to Control 1, the curve exhibits a large primary transition (glass transition) at nominally −21° C. in which the material goes from a rigid glass state to a soft, rubbery state. Beyond this transition, material's modulus exhibits a classic rubbery plateau. The ratio between the modulus at 25° C. and in the plateau state at 80° C. is 2.0.

Example 1

A two-component urethane composition was prepared according to Table 1 by using a polypropylene oxide-based triol polyol resin (amorphous liquid, MW=1500), mono-functional 1-decanol (amorphous liquid), and a trifunctional isocyanate based on hexamethyl diisocyanate (amorphous liquid). FIG. 1 shows plot of storage modulus versus temperature for Example 1. The curve exhibits a large primary transition (glass transition) at nominally −19° C. in which the material goes from a rigid glass state to a soft, rubbery state. Unlike Controls 1 and 2, the material exhibits a secondary ("melting") transition at a nominal temperature of 57° C. were the modulus further decreases and levels off to a rubbery plateau. The ratio between the modulus at 25° C. and in the plateau state at 80° C. is 13.2.

Example 2

A two-component urethane composition was prepared according to Table 1 using a polypropylene oxide-based triol polyol resin (amorphous liquid, MW=1500), mono-functional 1-decanol (amorphous liquid), and a uretdione based on hexamethylene diisocyanate (amorphous liquid). The sample exhibits a large primary transition (glass transition) at nominally −22° C. in which the material goes from a rigid glass state to a soft, rubbery state. The material also exhibits a secondary ("melting") transition at a nominal temperature of 57° C. were the modulus further decreased to levels too low to measure due to loss of mechanical properties.

Example 3

A two-component urethane composition was prepared according to Table 1 using castor oil polyol resin (amorphous liquid), mono-functional 1-decanol (amorphous liquid), and a trifunctional isocyanate based on hexamethyl diisocyanate (amorphous liquid). The sample exhibits a large primary transition (glass transition) at nominally −23° C. in which the material goes from a rigid glassy state to a soft, rubbery state. The material exhibits a secondary ("melting") transition at a nominal temperature of 57° C. were the modulus further decreases and levels off to a rubbery plateau. The ratio between the modulus at 25° C. and in the plateau state at 80° C. is 4.4.

Example 4

A two-component urethane composition was prepared according to Table 1 using castor oil polyol resin (amorphous liquid), mono-functional isostearyl alcohol (amorphous liquid), and a trifunctional isocyanate based on hexamethyl diisocyanate (amorphous liquid). The sample exhibits a large primary transition (glass transition) at nominally −17° C. in which the material goes from a rigid glassy state to a soft, rubbery state. The material exhibits a secondary ("melting") transition at a nominal temperature of 51° C. were the modulus further decreases and levels off to a rubbery plateau. The ratio between the modulus at 25° C. and in the plateau state at 80° C. is 8.3.

Example 5

A two-component urethane composition was prepared according to Table 1 using castor oil polyol resin (amorphous liquid), mono-functional 1-dodecanol (amorphous liquid), and a trifunctional isocyanate based on hexamethyl diisocyanate (amorphous liquid). The sample exhibits a large primary transition (glass transition) at nominally −8° C. in which the material goes from a rigid glassy state to a soft, rubbery state. The material exhibits a secondary ("melting") transition at a nominal temperature of 58° C. were the modulus further decreases and levels off to a rubbery plateau. The ratio between the modulus at 25° C. and in the plateau state at 80° C. is 69.6.

Example 6

A two-component urethane composition was prepared according to Table 1 using castor oil polyol resin (amorphous liquid), mono-functional 2-phenoxy alcohol (amorphous liquid), and a trifunctional isocyanate based on hexamethyl diisocyanate (amorphous liquid). The sample exhibits a large primary transition (glass transition) at nominally −3° C. in which the material goes from a rigid glass state to a soft, rubbery state. The material exhibits two secondary ("melting") transitions at nominal temperatures of 54° C. and 77° C. Beyond the last transition, the modulus exhibited a rubbery plateau. The ratio between the modulus at 25° C. and at 80° C. is 17.9.

Example 7

An unfilled, two-component urethane composition was prepared according to Table 1 using castor oil polyol resin (amorphous liquid), mono-functional 1-dodecanol (dissolved in polyol resin to form an amorphous blend), and a trifunctional isocyanate based on hexamethyl diisocyanate (amorphous liquid). The sample exhibits a large primary transition (glass transition) at nominally 2° C. in which the material goes from a rigid glass state to a soft, rubbery state. The material exhibits two secondary ("melting") transitions at nominal temperatures of 44° C. (minor) and 77° C. Beyond the last transition, the modulus exhibited a rubbery plateau at an onset temperature of nominally 90° C. The ratio between the modulus at 25° C. and at 90° C. is 20.2.

Example 8

Figures 2A, 2B:
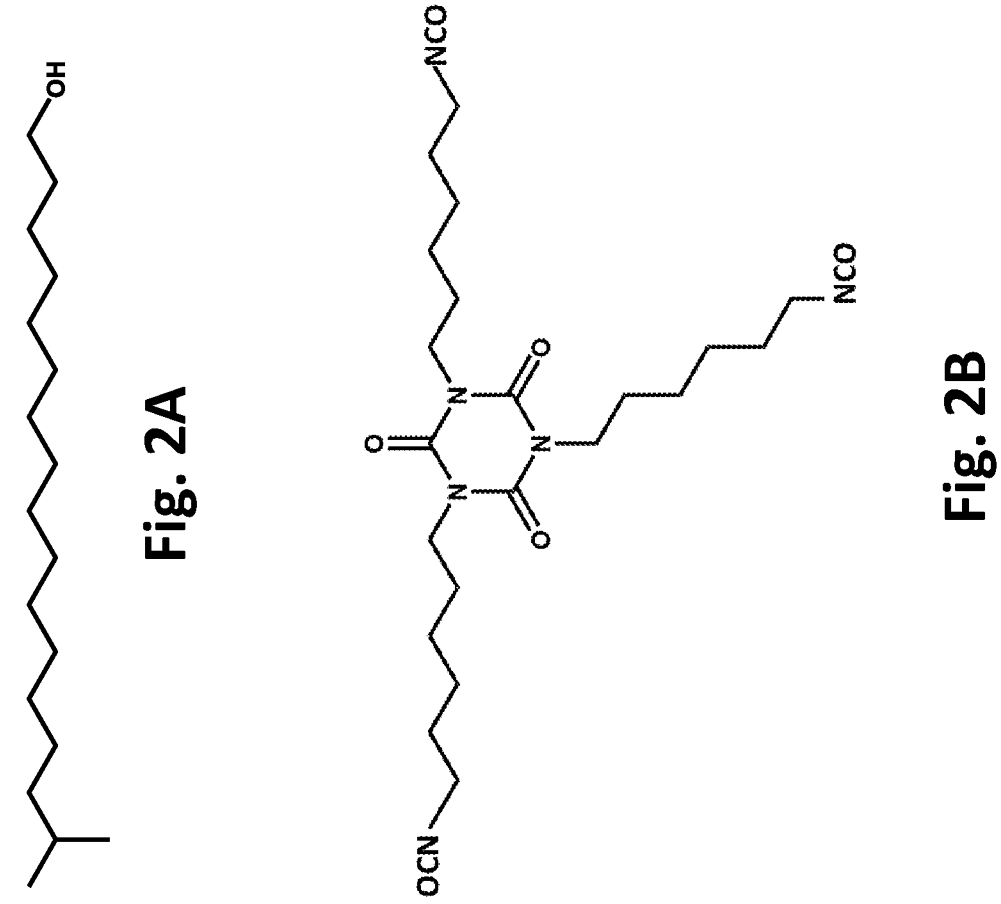
FIG. 2 is a schematic illustration of isostearyl alcohol (FIG. 2A) and trifunctional isocyanate based on hexamethylene diisocyanate (FIG. 2B)), used in some embodiments (Example 4) in making the disclosed compositions by reacting the two components to form a crystallizable species.
Figure 3:
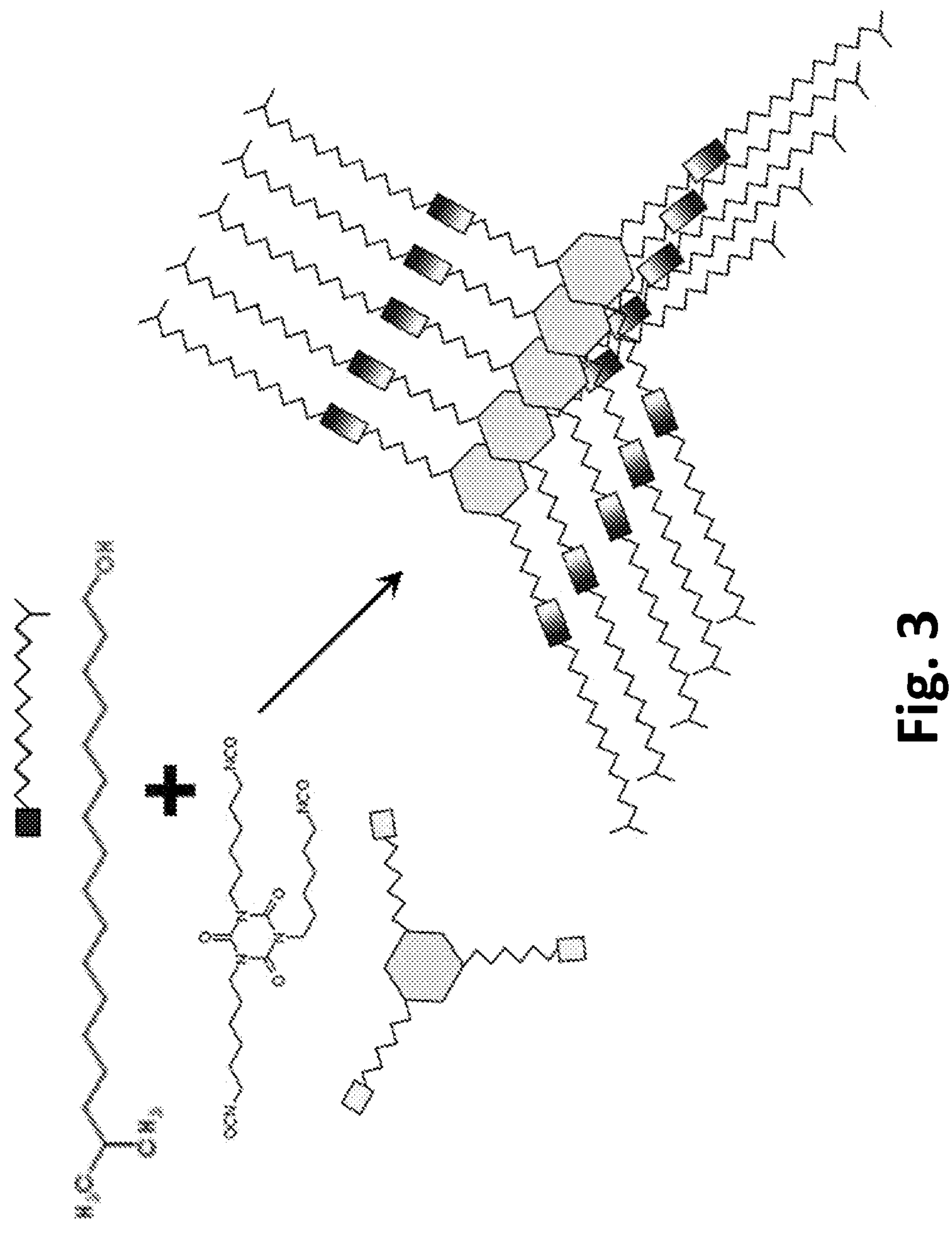
FIG. 3 is a schematic illustration of the formation of a crystal by combing the isostearyl alcohol and the trifunctional isocyanate based on hexamethylene diisocyanate (part b) of FIG. 1A.
Figure 4B:
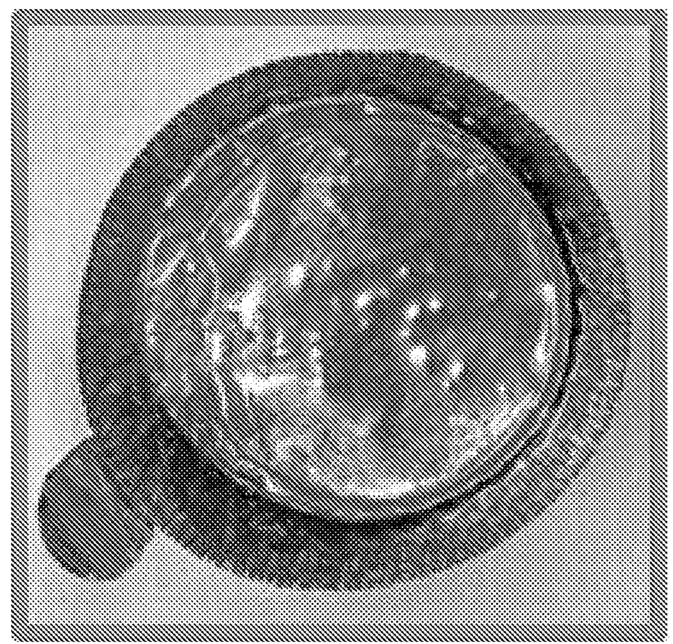
FIG. 4 shows photographs of the reaction product of isostearyl alcohol and trifunctional isocyanate based on hexamethylene diisocyanate that exhibits (FIG. 4A) crystalline morphology at room temperature and (FIG. 4B) a transparent amorphous state when heated about its melting point.
Figure 4A:
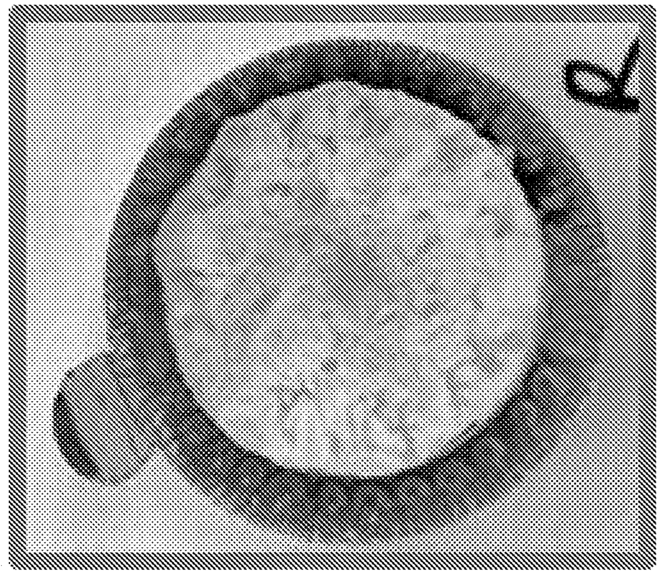
Figure 5:
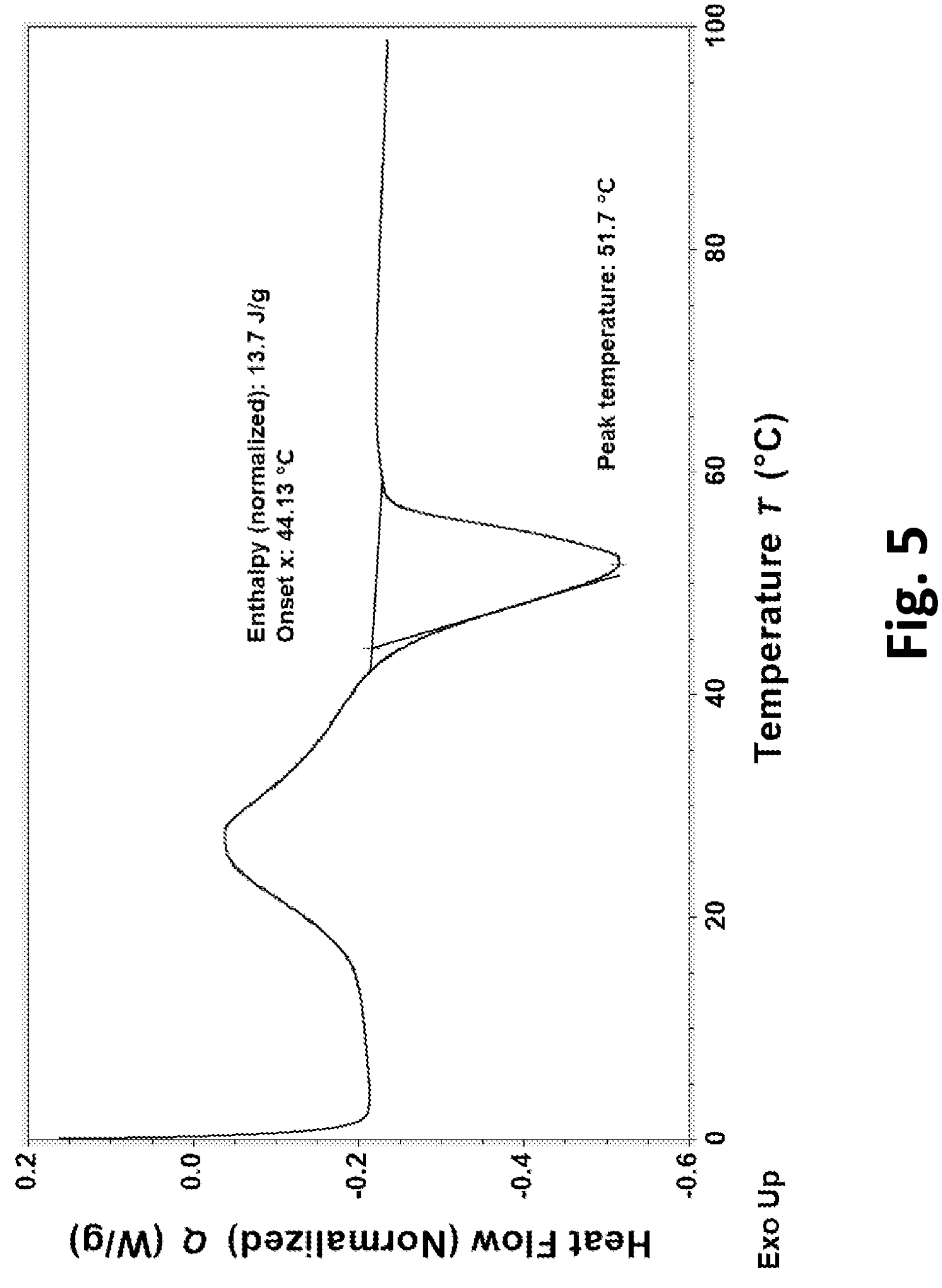
FIG. 5 shows a differential scanning calorimetry plot of heat flow (exotherm up) as function of temperature for the crystalline material formed from the reaction of isostearyl alcohol and trifunctional isocyanate based on hexamethylene diisocyanate (per FIG. 3 and Example 8.) The decrease in heat flow starting at 44° indicate the onset of melting of the crystalline species in the sample.
Figure 6:
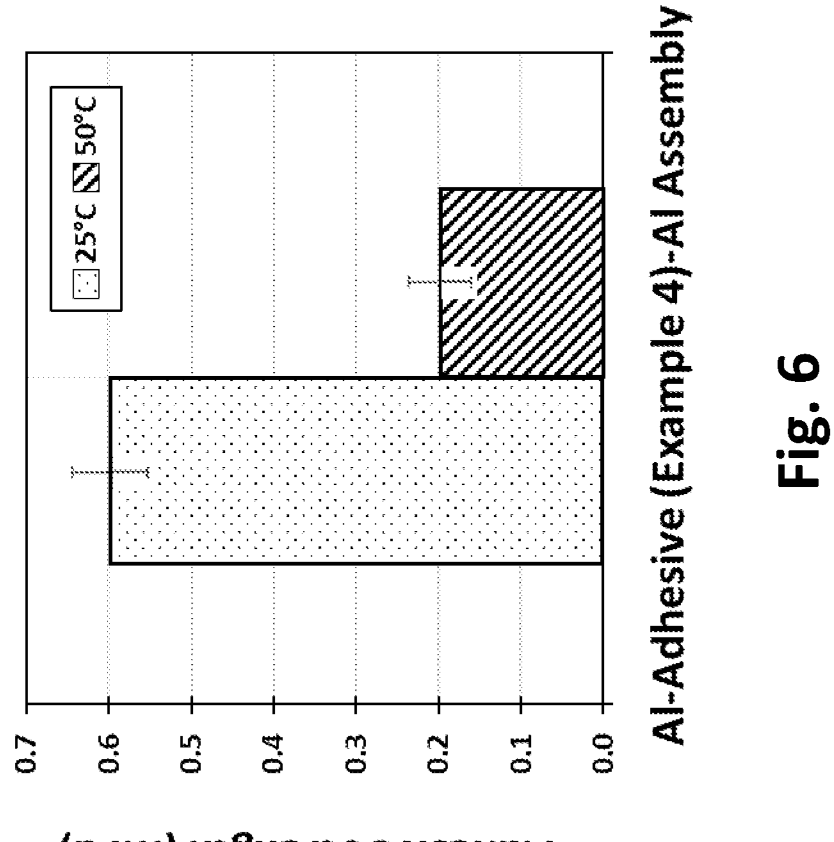
FIG. 6 shows the reduction in strength required break aluminum adherends bonded with a semi-crystalline polyurethane composition when the assembly is tested at 50° C. versus 25° C.

To provide further evidence of the formation of crystalline species, isostearyl alcohol (FIG. 2A) used in Example 4 was reacted solely with the trifunctional isocyanate based on hexamethylene diisocyanate (FIG. 2B) in stoichiometric proportions. FIG. 3 provides a pictorial description of the idealized crystalline structure that is formed from the reaction product. FIG. 4A shows experimental evidence of crystallites formed in the reaction product. FIG. 4B shows the disappearance of the crystallites when heated near its melting point of 50° C. Differential scanning calorimetry analysis was also performed on the reacted material using TA Instruments DMA 250. The sample was cooled from room temperature to 0° C. at 10° C./min, held to 0° C. for 5 minutes, and then heated to 100° C. at 10° C./min. FIG. 5 shows the heat flow measured during the final heating step. A strong melting peak is observed at 51.7° C. that coincides with the observations seen in FIG. 4 as well as the DMA analysis of Example 4.

Example 9

In demonstration a method for reducing the force (or stress) required to disassemble an element adhered to a substrate using the embodied adhesive composition, adhesive-adherent test specimens were prepared and tested as follows. Aluminum T-bar (6061 grade) specimens with a bond area of 38.1 mm by 38.1 mm were adhered together using the adhesive of that of Example 4. The adhesive was first dispensed from a 1:1 volumetric mix ratio cartridge onto one of the two substrates. To ensure a specific bond line thickness, glass spacers beads 763 micron in diameter, were sprinkled over the dispense adhesive before mating the second aluminum substrate. The materials were allowed to cure for 24 hours prior testing adhesive strength of the assembly. Adhesive strength was tested at room temperature and 50° C. using an Instron Universal testing machine at a grip displacement speed of 12.7 mm/min. FIG. 5 is shows the reduction in strength required break the adhesive bond of the semi-crystalline polyurethane composition when adhesives is tested at 50° C. relative to the strength tested at 25° C. This behavior is particularly useful for systems that need high strength during normal operation below the secondary thermal transition but low strength when the part is heated above the secondary transition during the disassembly process.

It will be understood that various details of the presently disclosed subject matter may be changed without departing from the scope of the presently disclosed subject matter. Furthermore, the foregoing description is for the purpose of illustration only, and not for the purpose of limitation.

The invention claimed is:

1. A reaction-induced crystallizable two-part polyurethane adhesive composition formed from amorphous constituents comprising:

a polyol resin comprising at least two functional groups;

a mono-functional resin containing one functional group, wherein the one functional group is a hydroxyl or amine terminal moiety and wherein the mono-functional resin comprises an alkyl group comprising a length of at least eight carbon atoms or wherein the mono-functional resin is 2-phenoxy alcohol;

an aliphatic isocyanate resin comprising at least two isocyanate groups, and a thermally conductive filler that is treated with material capable of co-crystallizing with the composition, wherein the polyol resin is included in a first component and the isocyanate resin is included in a second component, and wherein the mono-functional resin is contained in one or both of the first and second components such that the first and second components are configured to be mixed to react with each other and the mono-functional resin.

2. The composition of claim 1, wherein the mono-functional resin comprises a hydroxyl terminal moiety.

3. The composition of claim 1, wherein the first component further comprises a catalyst.

4. The composition of claim 1, wherein the second component further comprises a mono-functional resin possessing an isocyanate terminal moiety, or wherein the second component further comprises a thermally conductivity filler.

5. The composition of claim 4, wherein the second component further comprises a mono-functional resin possessing an isocyanate terminal moiety.

6. The composition of claim 1, wherein the polyol resin comprises secondary hydroxyl moieties.

7. The composition of claim 1, wherein the composition has at least one secondary transition greater than about 20° C. but less than about 85° C.

8. The composition of claim 1, wherein the polyol and polyisocyanate resins are based on linear or planar structures.

9. The composition of claim 8, wherein the polyol resin comprises a polyether polyol or a polyether resin.

10. The composition of claim 8, wherein the isocyanate resin comprises a mixture of an aliphatic isocyanate and an aromatic isocyanate.

11. The composition of claim 1, wherein the reacted composition has a secondary transition greater than about 20° C. but less than about 70° C.

12. The composition of claim 11, wherein the composition has a decrease in modulus after the secondary transition that is at least about 20% lower than the modulus before the secondary transition.

13. The composition of claim 1, further comprising a crystallized form of the composition in addition to the first and second components.

14. A method of forming a reaction-induced crystallizable two-part polyurethane adhesive composition, the method comprising:

combining a first component and second component at a room temperature, wherein the first component comprises a polyol resin comprising at least two functional groups and a thermally conductive filler that is treated with material capable of co-crystallizing with the composition, wherein the second component comprises an aliphatic isocyanate resin comprising at least two isocyanate groups, and wherein one or both of the first and second components further comprise a mono-functional resin containing one functional group, wherein the one functional group is a hydroxyl or amine terminal moiety and wherein the mono-functional resin further comprises an alkyl group comprising a length of at least eight carbon atoms or wherein the mono-functional resin is 2-phenoxy alcohol; and reacting the first component and the second component to cause the composition to crystallize.

15. The method of claim 14, further comprising adding to the combination of the first component and second component a portion of a pre-made crystallized form of the composition, or further comprising adding a catalyst, or further comprising adding a catalyst to the first component.

16. A method of adhering an element to a substrate, the method comprising:

providing an adhesive composition of claim 1;

providing a substrate and an element; and applying the adhesive composition to the substrate and/or element to adhere the element to the substrate.

17. The method of claim 16, wherein the element is a battery, or is a battery configured for an electric vehicle.

18. The method of claim 16, wherein the element is removable from the substrate after adhesion due to a temperature-induced transition of the adhesive composition.

19. The method of claim 16, wherein applying the adhesive composition comprises meter-mix dispensing, spraying, brushing, dipping, and/or rolling the adhesive on the substrate and/or element.

20. A reaction-induced crystallizable two-part adhesive composition formed from amorphous constituents comprising:

a polyol;

a mono-functional additive containing one reactive functional group, wherein the mono-functional additive is selected from 2-phenoxy alcohol and an alkyl monol comprising an alkyl group comprising at least 6 carbons;

an aliphatic isocyanate resin comprising at least two isocyanate groups, and a thermally conductive filler that is treated with material capable of co-crystallizing with the composition, wherein the polyol resin and the mono-function additive are included in a first component and the aliphatic isocyanate resin is included in a second component, wherein the first and second components are configured to be mixed to react with each other; and wherein the first and second components are free of an isocyanate prepolymer.

21. The composition of claim 20, wherein the first component further comprises a catalyst.

22. The composition of claim 20, wherein the composition has at least one secondary transition greater than about 20° C. but less than about 85° C., or wherein the composition has a decrease in modulus after the secondary transition that is at least about 20% lower than the modulus before the secondary transition.

23. The composition of claim 1, wherein the material capable of co-crystallizing with the composition comprises a saturated fatty acid, unsaturated fatty acid, or an organotitinate.

* * * * *